United States Patent
Xiang (10) Patent No.: US 12,438,795 B2
(45) Date of Patent: Oct. 7, 2025

(54) ANALYSIS OF DATA STREAM

(71) Applicant: New H3C Technologies Co., Ltd., Zhejiang (CN)

(72) Inventor: Xuefeng Xiang, Beijing (CN)

(73) Assignee: NEW H3C TECHNOLOGIES CO., LTD., Zhejiang (CN)

(*) Notice: Subject to any disclaimer, the term of this patent is extended or adjusted under 35 U.S.C. 154(b) by 427 days.

(21) Appl. No.: 17/997,525

(22) PCT Filed: Apr. 30, 2020

(86) PCT No.: PCT/CN2020/088403
§ 371 (c)(1),
(2) Date: Oct. 28, 2022

(87) PCT Pub. No.: WO2021/217612
PCT Pub. Date: Nov. 4, 2021

(65) Prior Publication Data
US 2023/0198880 A1 Jun. 22, 2023

(51) Int. Cl.
*H04L 43/087* (2022.01)
*H04L 43/022* (2022.01)
(Continued)

(52) U.S. Cl.
CPC .......... *H04L 43/087* (2013.01); *H04L 43/022* (2013.01); *H04L 43/062* (2013.01); *H04L 43/0835* (2013.01); *H04L 43/0852* (2013.01)

(58) Field of Classification Search
CPC . H04L 43/087; H04L 43/022; H04L 43/0835; H04L 43/062; H04L 43/0852
See application file for complete search history.

(56) References Cited

U.S. PATENT DOCUMENTS 6,591,298 B1  7/2003 Spicer et al.
2002/0194328 A1* 12/2002 Hallenbeck ............. H04L 67/12
                                                        709/224
(Continued)

FOREIGN PATENT DOCUMENTS

CN  1933429 A  3/2007
CN  101674204 A  3/2010
(Continued)

OTHER PUBLICATIONS

Japanese Patent Office, Office Action Issued in Application No. 2022-565926, Nov. 21, 2023, 4 pages. (Submitted with Machine Translation).
(Continued)

*Primary Examiner* — Brian J. Gillis
*Assistant Examiner* — Chhian (Amy) Ling
(74) *Attorney, Agent, or Firm* — McCoy Russell LLP (57) ABSTRACT

Provided are a method and device for analyzing a data stream. According to the method, one of a plurality of sampling periods having a same sampling duration and different start times is allocated to an audio and video stream. A first arrival data packet of the audio and video stream within the allocated sampling period is copied as a first sample data packet based on a sample stream entry. A last arrival data packet of the audio and video stream within the allocated sampling period is copied as a second sample data packet. A sender delay and a receiver delay of the audio and video stream are calculated based on respective timestamps of the first and second sample data packets. A jitter of the audio and video stream is analyzed based on the sender delay and the receiver delay.

15 Claims, 6 Drawing Sheets

(51) Int. Cl.
*H04L 43/062* (2022.01)
*H04L 43/0829* (2022.01)
*H04L 43/0852* (2022.01)

(56) References Cited

U.S. PATENT DOCUMENTS

| | | |
|---|---|---|
| 2006/0056429 A1 | 3/2006 | Usukura |
| 2007/0160073 A1* | 7/2007 | Toumura .............. H04L 43/028 370/351 |
| 2010/0020909 A1 | 1/2010 | Jung et al. |
| 2011/0255440 A1* | 10/2011 | Cociglio ............. H04L 43/0835 370/253 |
| 2014/0269378 A1* | 9/2014 | Holbrook .............. G11C 5/063 370/252 |
| 2015/0089045 A1 | 3/2015 | Agarwal et al. |
| 2015/0092585 A1 | 4/2015 | Shao et al. |
| 2015/0109953 A1* | 4/2015 | Cociglio ............... H04L 43/106 370/253 |
| 2015/0172197 A1 | 6/2015 | Sun et al. |
| 2016/0080784 A1* | 3/2016 | Kuwelkar .......... H04N 21/2407 725/75 |
| 2016/0105353 A1* | 4/2016 | Cociglio ................ H04L 43/50 370/252 |
| 2017/0099224 A1 | 4/2017 | O'Connor et al. |
| 2019/0230009 A1 | 7/2019 | Yousuf et al. |

FOREIGN PATENT DOCUMENTS

| | | |
|---|---|---|
| CN | 105359461 A | 2/2016 |
| CN | 105451036 A | 3/2016 |
| CN | 109672929 A | 4/2019 |
| CN | 109889398 A | 6/2019 |
| CN | 110601924 A | 12/2019 |
| JP | 2009231890 A | 10/2009 |
| JP | 2013026927 A | 2/2013 |
| JP | 2015521000 A | 7/2015 |
| WO | 2013174417 A1 | 11/2013 |

OTHER PUBLICATIONS

Moradi, F. et al., "On time-stamp accuracy of passive monitoring in a container execution environment," Proceedings of the 2016 IFIP Networking Conference (IFIP Networking) and Workshops, May 17, 2016, Vienna, Austria, 9 pages.
ISA State Intellectual Property Office of the People's Republic of China, Written Opinion of the International Searching Authority Issued in Application No. PCT/CN2020/088403, Jan. 27, 2021, WIPO, 6 pages.
European Patent Office, Extended European Search Report Issued in Application No. 20933205.5, May 22, 2023, Germany, 10 pages.
ISA China National Intellectual Property Administration, International Search Report Issued in Application No. PCT/CN2020/088403, Jan. 27, 2021, WIPO, 4 pages.

* cited by examiner

ANALYSIS OF DATA STREAM

CROSS REFERENCE TO RELATED APPLICATION

The present application is a U.S. National Phase of International Application No. PCT/CN2020/088403 entitled "DATA STREAM ANALYSIS," and filed on Apr. 30, 2020. The entire contents of the above-listed application are hereby incorporated by reference for all purposes.

BACKGROUND

In a network audio and video service, such as cross-network video conferencing, Internet Protocol Television (IPTV) service, network online live broadcast, or the like, real-time audio and video data is transmitted over a network.

Real-time Transport Protocol (RTP) is a protocol for transmitting audio and video data across Internet Protocol (IP) networks.

DETAILED DESCRIPTION

In order to make those skilled in the art better understand some examples of the present disclosure, and make objects, features and advantages of some examples of the present disclosure more apparent, some examples of the present disclosure will be further described in detail below with reference to the accompanying drawings.

Figure 1:
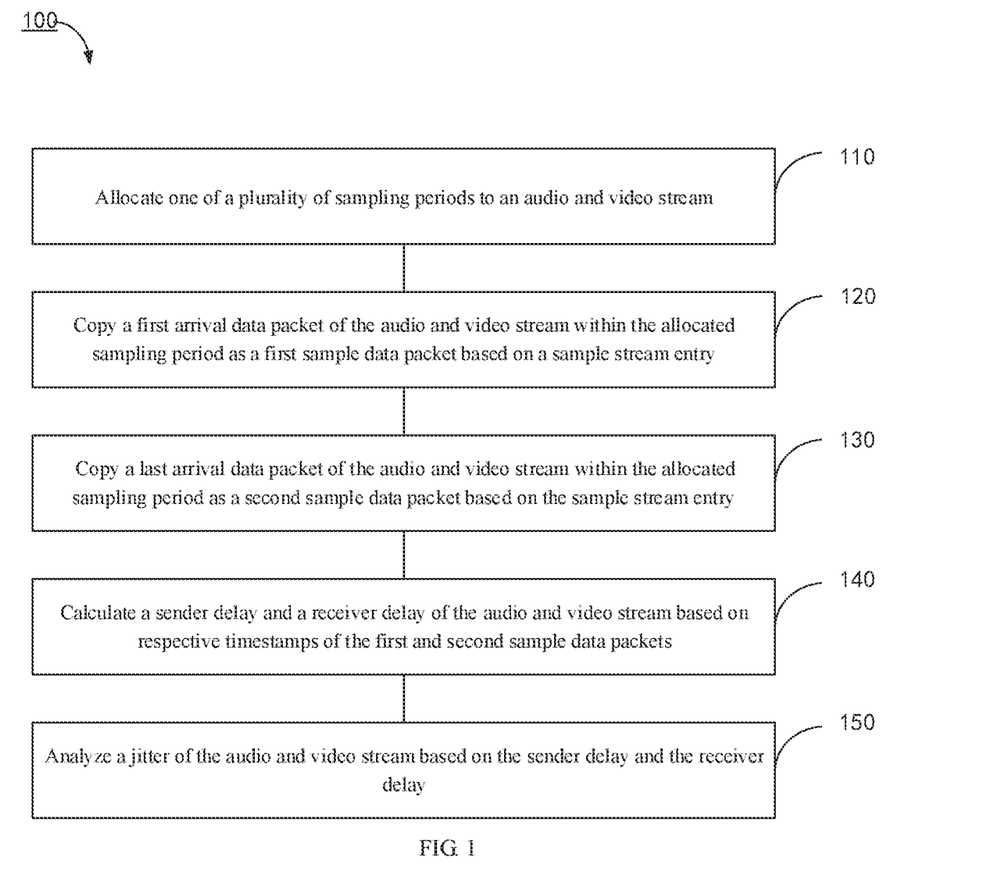
FIG. 1 is a flowchart of a method of analyzing a data stream according to an example of the present disclosure.

As illustrated in FIG. 1, a method 100 of analyzing a data stream according to an example of the present disclosure may comprise Processes 110-150.

In Process 110, one of a plurality of sampling periods is allocated to an audio and video stream, where the plurality of sampling periods have the same sampling duration and have different start times respectively.

In Process 120, a first arrival data packet of the audio and video stream within the allocated sampling period is copied as a first sample data packet based on a sample stream entry corresponding to the audio and video stream.

In Process 130, a last arrival data packet of the audio and video stream within the allocated sampling period is copied as a second sample data packet based on the sample stream entry.

In Process 140, a sender delay and a receiver delay of the audio and video stream are calculated based on respective timestamps of the first and second sample data packets.

In Process 150, a jitter of the audio and video stream is analyzed based on the sender delay and the receiver delay.

In the method illustrated in FIG. 1, different audio and video streams are sampled respectively within a plurality of sampling periods, and the number of sample data packets used to analyze quality of each audio and video stream is reduced. When an apparatus analyzes quality of a large number of audio and video streams with the method as illustrated in FIG. 1, the load of the apparatus is reduced.

In order to make those skilled in the art better understand some examples of the present disclosure, some examples of the present disclosure will be described below with reference to specific application scenarios.

Figure 2:
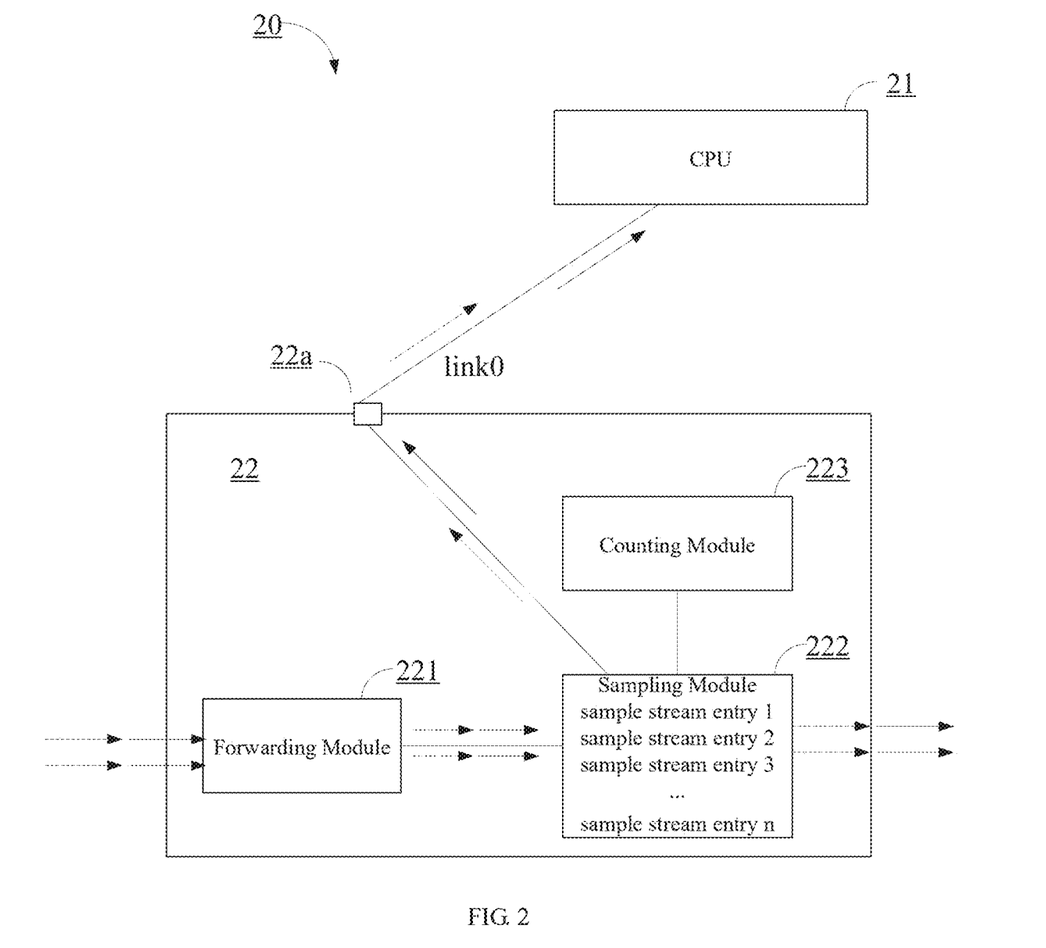
FIG. 2 is a schematic diagram of analyzing quality of an audio and video stream by an apparatus according to an example of the present disclosure.

FIG. 2 is a schematic diagram of analyzing quality of an audio and video stream by an apparatus 20 according to an example of the present disclosure. In FIG. 2, a central processing unit (CPU) 21 is connected with a port 22a of a switch chip 22 through a data channel link0. A forwarding module 221 of the switch chip 22 stores a layer 2 forwarding table and a layer 3 forwarding table. A sampling module 222 of the switch chip 22 stores sample stream entries respectively for n different audio and video streams to be analyzed. Real-time Transport Protocol (RTP) packets for the different audio and video streams arrived at the apparatus 20. For example, as illustrated in FIG. 2, an RTP packet indicated by a solid line arrived earlier than another RTP packet indicated by a dotted line. The forwarding module 221 forwards the RTP packets. The sampling module 222 samples the different audio and video streams within different sampling periods, respectively, and transmits sample data packets of the audio and video stream to be sampled within each sampling period to the CPU 21 through the data channel link0 connected to the port 22a. The CPU 21 analyzes the respective audio and video streams based on the received sample data packets. A counting module 223 binds one counter to each sample stream entry in the sampling module 222, so as to count the number of the RTP packets matching audio and video stream characteristic information in a match item (i.e., matching field) of the sample stream entry.

Figure 3:
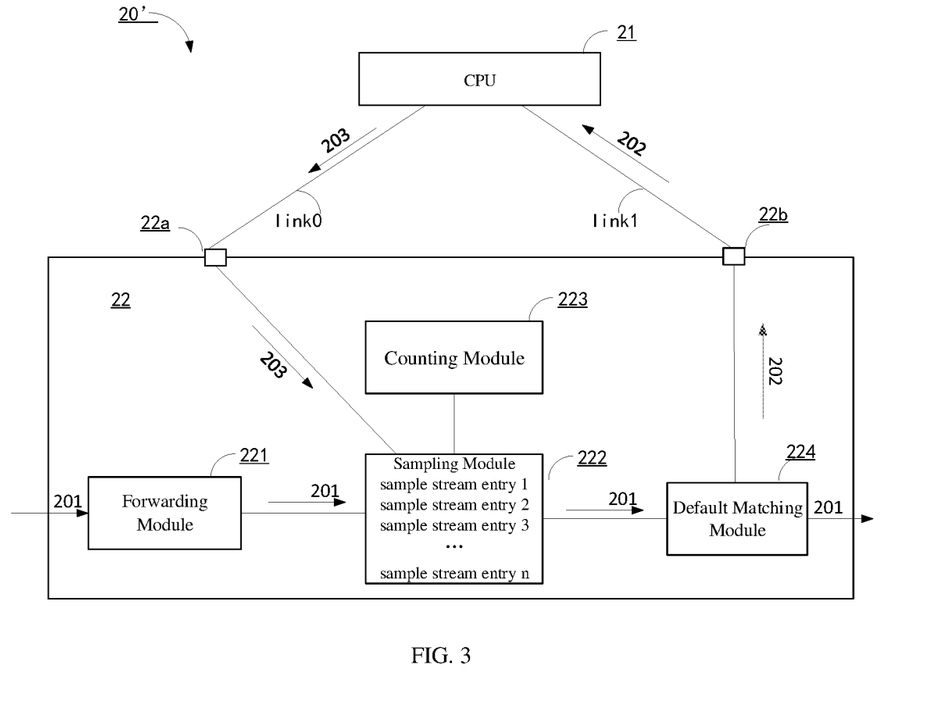
FIG. 3 is a schematic diagram of analyzing quality of an audio and video stream by an apparatus according to another example of the present disclosure.

FIG. 3 is a schematic diagram of analyzing quality of an audio and video stream by an apparatus 20' according to another example of the present disclosure. In the apparatus 20' as shown in FIG. 3, the CPU 21 is connected with the port 22a of the switch chip 22 through the data channel link0, and is connected with a port 22b of the switch chip 22 through a data channel link1. The forwarding module 221 of the switch chip 22 stores a layer 2 forwarding table and a layer 3 forwarding table. The sampling module 222 of the switch chip 22 stores sample stream entries respectively for n different audio and video streams that have been analyzed.

Figure 4:
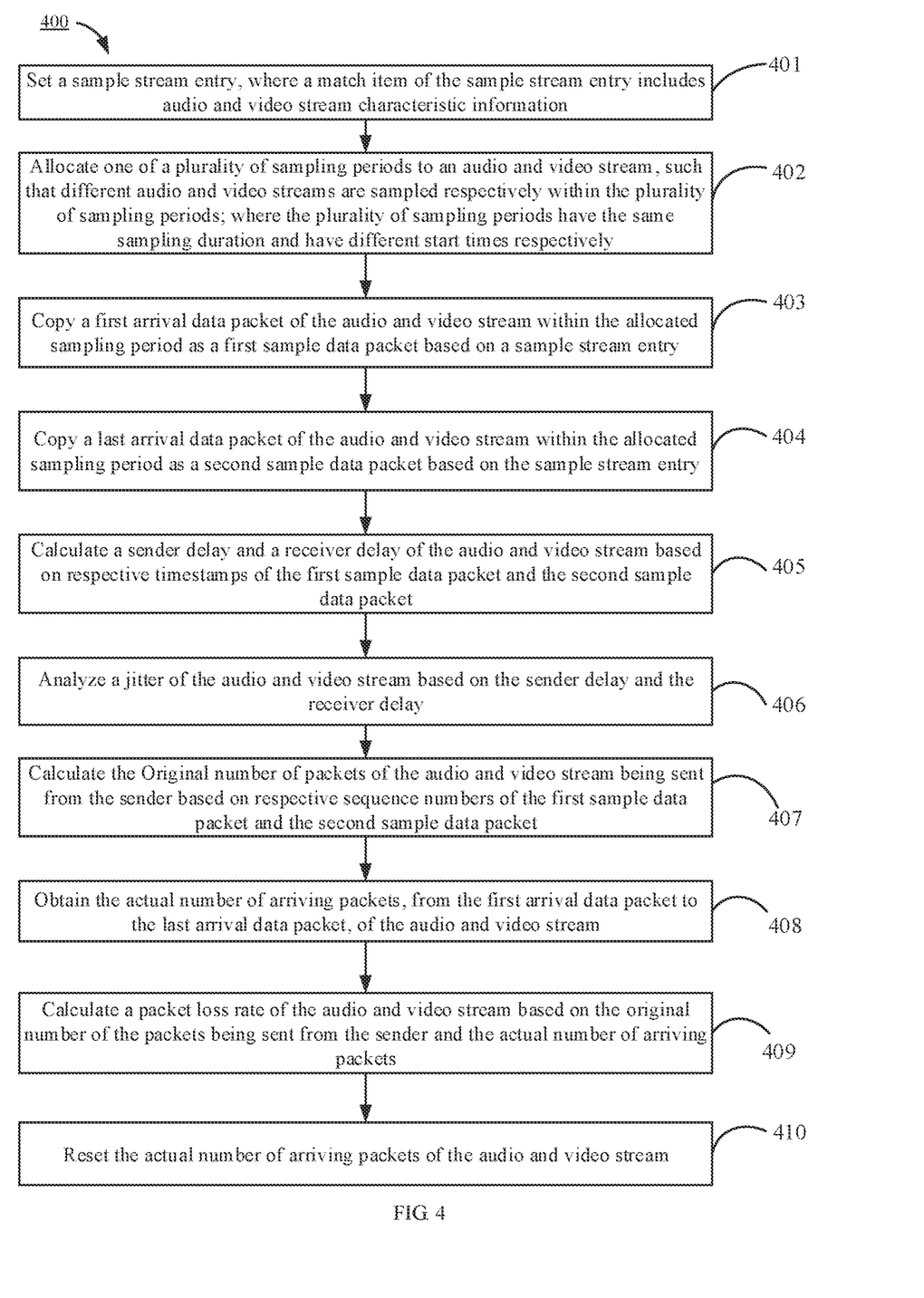
FIG. 4 is a flowchart of an audio and video stream analysis method according to an example of the present disclosure.

FIG. 4 is a flowchart of a method 400 of analyzing an audio and video stream according to an example of the present disclosure, which is applicable to the apparatus 20' illustrated in FIG. 3. The method 400 may comprise Processes 401~410.

In Process 401, a sample stream entry is set, where a match item of the sample stream entry includes audio and video stream characteristic information.

When a first RTP packet 201 of an audio and video stream arrives at the apparatus 20', the forwarding module 221 forwards the first RTP packet 201. The sampling module 222 performs a lookup in sample stream entries 1-$n$ based on stream characteristic information in the first RTP packet 201. If the sampling module 222 determines that none of the sample stream entries 1~n matches the first RTP packet 201, the sampling module 222 adds a matching failure flag to the first RTP packet 201. A default matching module 224 finds a default stream entry matching the first RTP packet 201 with the matching failure flag. The default stream entry includes: a match item comprising a packet type of RTP over User Datagram Protocol (UDP) and the matching failure flag; and an action item (i.e., action instruction) indicating output of a copied data packet to the CPU 21.

The default matching module 224 copies the first RTP packet 201 as an RTP packet 202, and transmits the RTP packet 202 to the CPU 21 through the data channel link1 connected with the port 22*b*. The matching failure flag of the first RTP packet 201 is removed after the first RTP packet 201 has left the default matching module 224.

Upon receiving the RTP packet 202, the CPU 21 obtains stream characteristic information, such as 5-tuple information, therefrom.

Based on the obtained stream characteristic information in the RTP packet 202, the CPU 21 generates a new sample stream entry 203, where the match item comprises audio and video stream characteristic information, and the action item is null. The CPU 21 synchronizes the new sample stream entry 203 to the sampling module 222 through the data channel link0 and the port 22*a* connected therewith, such that the sampling module 222 stores the (n+1)th sample stream entry (not illustrated in FIG. 3). As such, apparatus 20' in FIG. 3 may generate a new sample stream entry based on the first packet of an unsampled audio and video stream.

In Process 402, one of a plurality of sampling periods is allocated to an audio and video stream, such that different audio and video streams are sampled respectively within the plurality of sampling periods. The plurality of sampling periods have the same sampling duration and have different start times respectively.

The CPU 21 may set the plurality of sampling periods having the same sampling duration, and set different start times respectively for the plurality of sampling periods, such that the plurality of sampling periods start sampling respectively at different times.

The CPU 21 may set a plurality of scanners, where a respective scanner of the plurality of scanners corresponds to a sampling period, and the plurality of scanners start at the different start times to scan the different audio and video streams for audio and video stream sampling. The CPU 21 may achieve allocating one of the plurality of sampling periods to an audio and video stream by allocating a scanner to the audio and video stream.

The CPU 21 may allocate the plurality of scanners in a way that the number of the audio and video streams to be scanned by each scanner is relatively uniform, which may avoid a situation where some scanners have too high load and the other scanners have too low load, thereby improving the reasonability of scanner allocation.

For example, the CPU 21 may select each scanner and each audio and video stream to be analyzed in a poll way, and allocate the selected scanner to the selected corresponding audio and video stream.

Alternatively, the CPU 21 may allocate the scanners to the audio and video streams by using a Hash algorithm based on the number of the scanners, such that the different audio and video streams are sampled respectively by the plurality of scanners.

For example, assuming that the number of the scanners is n, the remainder of an entry serial number of a sample stream entry for an audio and video stream, divided by n, may be obtained, and the audio and video stream may be classified based on the remainder. The audio and video streams with the same remainder may be classified into the same category. The audio and video streams with different remainders may be classified into different categories, respectively. The same category of audio and video streams may share one scanner. Different categories of audio and video streams may respectively use different scanners with staggered start times, thereby avoiding CPU 21 receiving the sample data packets too centrally.

Figure 5:
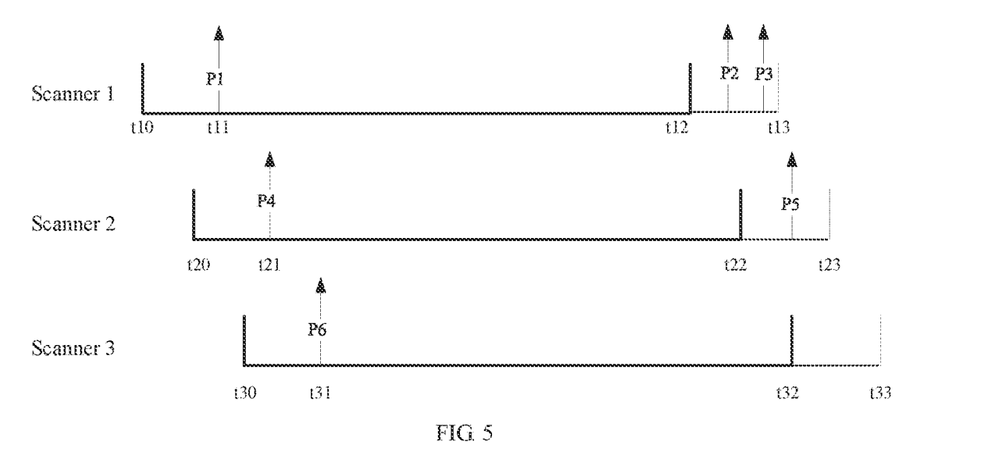
FIG. 5 is a schematic diagram of sampling different audio and video streams within a plurality of sampling periods, respectively, according to an example of the present disclosure.

FIG. 5 is a schematic diagram of sampling different audio and video streams within a plurality of sampling periods, respectively, according to an example of the present disclosure.

For example, it is assumed that n is 3, that is, providing 3 scanners, such as scanners 1 to 3 as illustrated in FIG. 5. For each audio and video stream, the remainder of an entry serial number of a sample stream entry for the audio and video stream, divided by 3, is obtained. When the obtained remainder is 0, the audio and video stream may be scanned by scanner 3; when the obtained remainder is 1, the audio and video stream may be scanned by scanner 1; and, when the obtained remainder is 2, the audio and video stream may be scanned by scanner 2.

In Process 403, a first arrival data packet of the audio and video stream within the allocated sampling period is copied as a first sample data packet based on a sample stream entry.

In Process 404, a last arrival data packet of the audio and video stream within the allocated sampling period is copied as a second sample data packet based on the sample stream entry.

For any audio and video stream, the CPU 21 may instruct, based on the sample stream entry corresponding to the audio and video stream in the sampling period allocated to the audio and video stream, the switch chip 22 to copy the first arrival data packet of the audio and video stream in the sampling period as the first sample data packet to be output to the CPU 21, and to copy the last arrival data packet of the audio and video stream in the sampling period as the second sample data packet to be output to the CPU 21.

Figure 6:
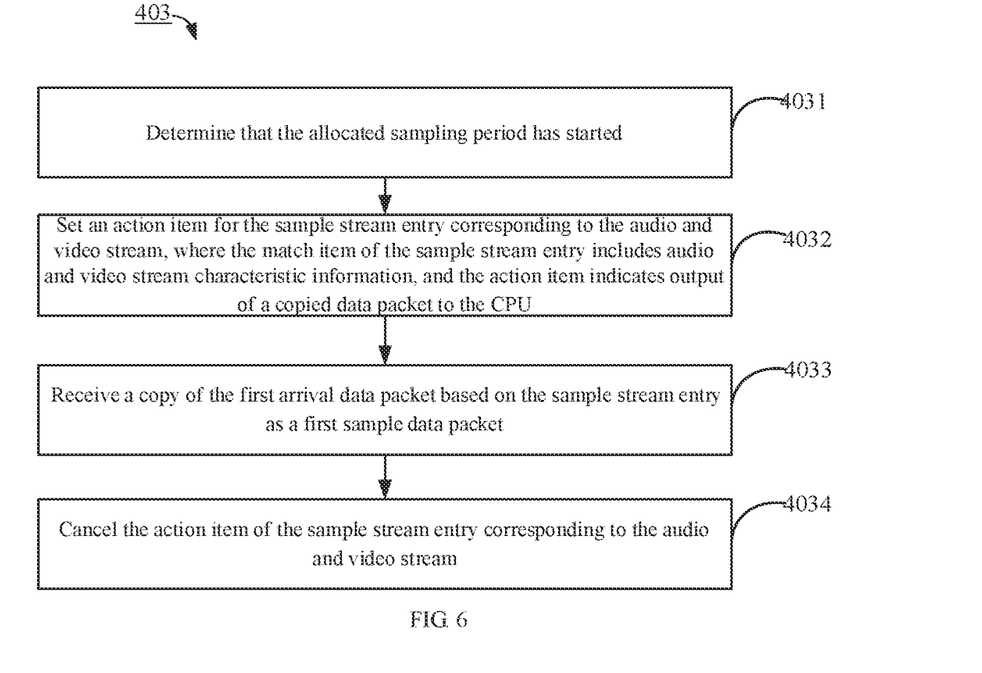
FIG. 6 is a flowchart of obtaining a first sample data packet according to an example of the present disclosure.

FIG. 6 is a flowchart of the Process 403 of obtaining the first sample data packet according to an example of the present disclosure. As illustrated in FIG. 6, the Process 403 may include the following processes.

In Process 4031, it is determined that the allocated sampling period has started.

For any audio and video stream, the CPU 21 may determine whether a sampling period allocated to the audio and video stream has started based on the start time of the sampling period. That is, the CPU 21 may determine start of each sampling period based on the time when the scanner corresponding to the sampling period is started.

In Process 4032, an action item is set for the sample stream entry corresponding to the audio and video stream. The match item of the sample stream entry includes audio and video stream characteristic information. The action item may be used to instruct output of a copied data packet to the CPU.

When the CPU 21 determines that the sampling period allocated to the audio and video stream has started, an action item may be set for the sample stream entry corresponding to the audio and video stream, so as to instruct output of a copied data packet to the CPU.

For example, the CPU 21 may transmit to the switch chip 22 a first setting instruction carrying audio and video stream characteristic information. Upon receiving the first setting instruction, the switch chip 22 may retrieve a sample stream entry "n" matching the audio and video stream characteristic information, and set an action item, such as "copy to CPU", for the retrieved sample stream entry "n".

Upon determining that the received data packet matches the match item of the sample stream entry, the switch chip 22 may copy the data packet based on the action item of the sample stream entry and output the copied data packet to the CPU 21.

In Process 4033, a copy of the first arrival data packet based on the sample stream entry is received as the first sample data packet.

Upon receiving a first copied packet of the audio and video stream within the current sampling period, the CPU 21 may take the copied packet as the first sample data packet of the audio and video stream.

In Process 4034, the action item of the sample stream entry corresponding to the audio and video stream is cancelled.

Upon receiving the first sample data packet of the audio and video stream, the CPU 21 may cancel the action item of the sample stream entry corresponding to the audio and video stream.

For example, the CPU 21 may transmit to the switch chip 22 a second setting instruction carrying audio and video stream characteristic information. Upon receiving the second setting instruction, the switch chip 22 may retrieve a sample stream entry matching the audio and video stream characteristic information, and cancel the action item of the retrieved sample stream entry "n".

When the switch chip 22 receives a further data packet matching the match item of the sample stream entry, the sampling module 222 may not output to the CPU 21 a copied packet of the RTP data packet matching the sample stream entry "n".

Figure 7:
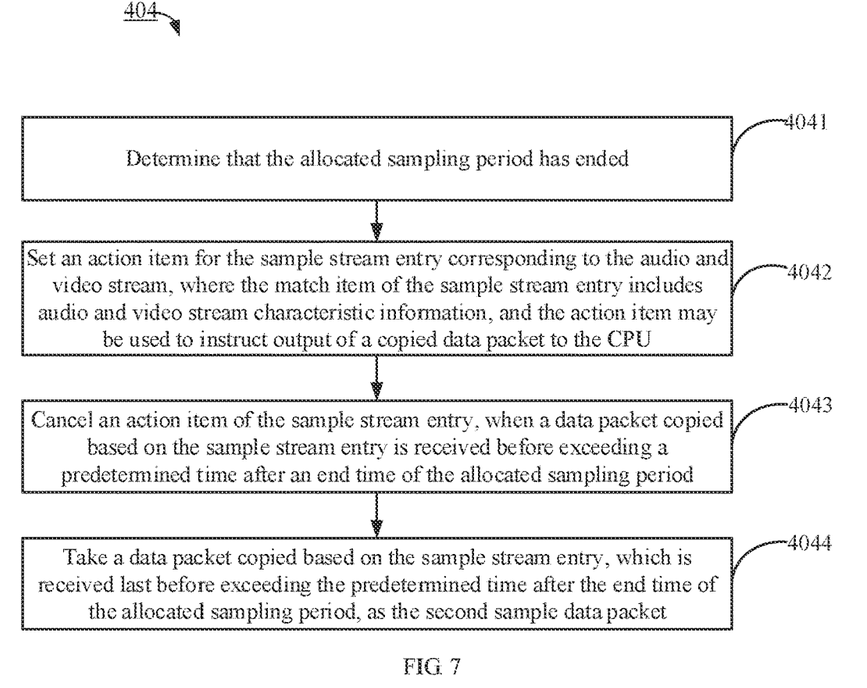
FIG. 7 is a flowchart of obtaining a second sample data packet according to an example of the present disclosure.

FIG. 7 is a flowchart of the Process 404 in a method of obtaining a second sample data packet according to an example the present disclosure. As illustrated in FIG. 7, the Process 404 may include the following processes.

In Process 4041, it is determined that the allocated sampling period has ended.

For any audio and video stream, the CPU 21 may determine whether the sampling period allocated to the audio and video stream has ended based on the sampling duration and the start time of the scanner allocated to the audio and video stream.

In Process 4042, an action item is set for the sample stream entry corresponding to the audio and video stream. The match item of the sample stream entry includes audio and video stream characteristic information. The action item may be used to output of a copied data packet to the CPU.

When the CPU 21 determines that the sampling period allocated to the audio and video stream has ended, an action item may be set for the sample stream entry "n" corresponding to the audio and video stream, so as to instruct output of a copied data packet to the CPU.

In Process 4043, when a data packet copied based on the sample stream entry is received before exceeding a predetermined time after an end time of the allocated sampling period, an action item of the sample stream entry may be cancelled.

In Process 4044, a data packet copied based on the sample stream entry, which is received last before exceeding the predetermined time after the end time of the allocated sampling period, is taken as the second sample data packet.

After an action item is set for the sample stream entry corresponding to the audio and video stream, the CPU 21 may receive a data packet copied based on the sample stream entry, that is, a copy of a data packet of the audio and video stream.

When the CPU 21 receives a data packet copied based on the sample stream entry "n" before exceeding the predetermined time (for example, 5 seconds) after the end time of the sampling period allocated to the audio and video stream, the CPU 21 may cancel the action item of the sample stream entry "n".

If the switch chip 22 receives a further data packet matching the match item of the sample stream entry "n" after the action item of the sample stream entry "n" is cancelled, the switch chip 22 may not output a copy of the further data packet to the CPU 21.

It may take a certain time for the CPU 21 to complete cancellation of the action item of the sample stream entry "n". Thus, within the time, which starts when the CPU 21 determines cancellation of the action item of the sample stream entry "n" and ends when the cancellation of the action item of the sample stream entry "n" is completed, the sampling module 222 of the switch chip 22 may still output one or more copied data packets to the CPU 21 based on the sample stream entry. The CPU 21 may take a data packet copied based on the sample stream entry, which is received last before exceeding the predetermined time after the end time of the sampling period allocated to the audio and video stream, as the second sample data packet.

If the CPU 21 does not receive any data packet copied based on the sample stream entry within the predetermined time after the end time of the sampling period allocated to the audio and video stream, that is, the second sample data packet cannot be obtained, the CPU 21 may cancel the action item of the sample stream entry after the predetermined time, and determine the allocated sampling period as an invalid sampling period for the audio and video stream, so as not to analyze a quality index of the audio and video stream with respect to the sampling period.

Example implementation of obtaining the first sample data packet and the second sample data packet will be described below with reference to FIG. 5.

As illustrated in FIG. 5, it is assumed that 3 scanners comprising scanner 1, scanner 2, and scanner 3 are provided. The scanners 1-3 may have respective sampling periods with the same sampling duration and different start times, and the scanners 1-3 may be respectively allocated to different audio and video streams.

As illustrated in FIG. 5, the scanner 1 is turned on at time t10, and then the CPU 21 may set an action item, such as "copy to CPU", for sample stream entry 1 corresponding to the audio and video stream 1 to which the scanner 1 is allocated. Upon receiving a data packet of the audio and video stream 1 after the time t10, the switch chip 22 may find the sample stream entry 1 matching the audio and video stream 1, and transmit a packet P1, which is copied from the data packet, to the CPU 21 based on the action item of the sample stream entry 1. The CPU 21 may receive the copied packet P1 at time t11, take the copied packet P1 as the first sample data packet of the audio and video stream 1, and then cancel the action item of the sample stream entry 1 corresponding to the audio and video stream 1.

The sampling period of the scanner 1 ends at time t12. Then, the CPU 21 may set an action item for the sample stream entry 1 corresponding to the audio and video stream 1 to which the scanner 1 is allocated, and start a timer that will expire at time t13. Upon receiving a data packet of the audio and video stream 1 between the time t12 and the time t13, the switch chip 22 may find the sample stream entry 1 matching the audio and video stream 1, and transmit a packet, which is copied from the data packet, to the CPU 21 based on the action item of the sample stream entry 1.

The CPU 21 may determine whether a copy of the data packet of the audio and video stream 1 is received before the time t13, i.e., the timer of the scanner 1 expires. If the CPU 21 consecutively receives packets P2 and P3, which are copied from the data packet of the audio and video stream 1, before the time t13, the CPU 21 may cancel the action item of the sample stream entry 1 corresponding to the audio and video stream 1 upon receiving the copied packet P2, and take the copied packet P3 as the second sample data packet of the audio and video stream 1.

Assuming that the CPU 21 receives a packet copied from the data packet of the audio and video stream 1 after the time t13, the CPU 21 may not count the copied packet in the current sampling period since the timer of the scanner 1 has expired.

The scanner 2 is turned on at time t20, and then the CPU 21 may set an action item, such as "copy to CPU", for sample stream entry 2 corresponding to the audio and video stream 2 to which the scanner 2 is allocated. Upon receiving a data packet of the audio and video stream 2, the switch chip 22 may find the sample stream entry 2 matching the audio and video stream 2, and transmit a packet P4, which is copied from the data packet, to the CPU 21 based on the action item of the sample stream entry 2. The CPU 21 may receive the copied packet P4 at time t21, take the copied packet P4 as the first sample data packet of the audio and video stream 2, and then cancel the action item of the sample stream entry 2 corresponding to the audio and video stream 2.

The sampling period of the scanner 2 ends at time t22. Then, the CPU 21 may set an action item for the sample stream entry 2 corresponding to the audio and video stream 2 to which the scanner 2 is allocated, and start a timer that will expire at time t23. Upon receiving a data packet of the audio and video stream 2, the switch chip 22 may find the sample stream entry 2 matching the audio and video stream 2, and transmit a packet, which is copied from the data packet, to the CPU 21 based on the action item of the sample stream entry 2.

If the CPU 21 determines that a packet P5, which is copied from the data packet of the audio and video stream 2, is received before the time t23, the CPU 21 may cancel the action item of the sample stream entry 2 corresponding to the audio and video stream 2, and take the copied packet P5 as the second sample data packet of the audio and video stream 2.

The scanner 3 is turned on at time t30, and then the CPU 21 may set an action item, such as "copy to CPU", for sample stream entry 3 corresponding to the audio and video stream 3 to which the scanner 3 is allocated. Upon receiving a data packet of the audio and video stream 3, the switch chip 22 may find the sample stream entry 3 matching the audio and video stream 3, and transmit a packet P6, which is copied from the data packet, to the CPU 21 based on the action item of the sample stream entry 3. The CPU 21 may receive the copied packet P6 at time t31, take the copied packet P6 as the first sample data packet of the audio and video stream 3, and then cancel the action item of the sample stream entry 3 corresponding to the audio and video stream 3.

The sampling period of the scanner 3 ends at time t32. Then, the CPU 21 may set an action item for the sample stream entry 3 corresponding to the audio and video stream 3 to which the scanner 3 is allocated, and start a timer that will expire at time t33. Upon receiving a data packet of the audio and video stream 3, the switch chip 22 may find the sample stream entry 3 matching the audio and video stream 3, and transmit a packet, which is copied from the data packet, to the CPU 21 based on the action item of the sample stream entry 3.

The CPU 21 may determine whether a copy of the data packet of the audio and video stream 3 is received before the time t33, i.e., before the timer expires. If the CPU 21 does not receive any packet, which is copied from the data packet of the audio and video stream 3, before the time t33, the CPU 21 may cancel the action item of the sample stream entry 3 corresponding to the audio and video stream 3 at time t33, and determine the sampling period as an invalid sampling period for the audio and video stream 3, so as not to analyze a quality index of the audio and video stream 3 with respect to the sampling period.

In Process 405, a sender delay and a receiver delay of the audio and video stream are calculated based on respective timestamps of the first sample data packet and the second sample data packet.

In Process 406, a jitter of the audio and video stream is analyzed based on the sender delay and the receiver delay.

Upon obtaining the first sample data packet and the second sample data packet, the CPU 21 may calculate the sender delay and the receiver delay of the audio and video stream based on the respective timestamps of the first sample data packet and the second sample data packet.

Taking the audio and video stream 1, described above with reference to FIG. 5, for example, the CPU 21 may calculate the sender delay and the receiver delay of the audio and video stream 1 based on respective timestamps of the copied packet P1 and the copied packet P3.

Assuming that a transmitting timestamp of the copied packet P1, i.e., a timestamp in the RTP header of the copied packet P1, is TS0, and that a transmitting timestamp of the copied packet P3, i.e., a timestamp in the RTP header of the copied packet P3, is TS1, the sender delay of the audio and video stream 1 in current sampling period may be expressed as $\Delta T1=TS1-TS0$.

Assuming that a receiving timestamp of the copied packet P1, i.e., a timestamp that is added to the copied packet P1 when the switch chip 22 outputs the copied packet P1 to the CPU 21, is TS2, and that a receiving timestamp of the copied packet P3, i.e., a timestamp that is added to the copied packet P3 when the switch chip 22 outputs the copied packet P3 to the CPU 21, is TS3, the receiver delay of the audio and video stream 1 in the current sampling period may be expressed as $\Delta T2=TS3-TS2$.

Then, the CPU 21 may determine the jitter of the audio and video stream 1 in the current sampling period as $Jitter=|\Delta T2-\Delta T1|$.

In Process 407, original number of packets of the audio and video stream being sent from the sender is calculated based on respective sequence numbers of the first sample data packet and the second sample data packet.

Upon obtaining the first and second sample data packets, the CPU 21 may calculate the original number of packets of the audio and video stream being sent from the sender based on the respective sequence numbers of the first sample data packet and the second sample data packet.

Still taking the audio and video stream 1, described above with reference to FIG. 5, for example, the CPU 21 may calculate the original number of the packets of the audio and video stream being sent from the sender based on the sequence number of the copied packet P1 and the sequence number of the copied packet P3.

Assuming that the sequence number of the copied packet P1, i.e., the sequence number in the RTP header of the copied packet P1, is SN0, and that the sequence number of the copied packet P3, i.e., the sequence number in the RTP header of the copied packet P3, is SN1, the original number of packets of the audio and video stream 1 being sent from the sender in the current sampling period may be expressed as delta=SN1−SN0.

stored in Table 1 as below. For the audio and video stream, if the current index data is greater than the maximum index data, the maximum index data in Table 1 may be updated to the current index data; if the current index data is less than the minimum index data, the minimum index data in Table 1 may be updated to the current index data. In addition, the CPU 21 may calculate and refresh average index data of the audio and video stream in historical sampling periods.

TABLE 1

| Serial Number | 5-tuple Information | Total Number OF Sampling Periods | Maximum Packet Loss Rate in Historical Sampling Periods | Maximum Jitter in Historical Sampling Periods | Average Packet Loss Rate In Historical Sampling Periods | Average Jitter in Historical Sampling Periods | Minimum Packet Loss Rate in Historical Sampling Periods | Minimum Jitter in Historical Sampling Periods |
|---|---|---|---|---|---|---|---|---|
| 1 | | | | | | | | |
| 2 | | | | | | | | |
| 3 | | | | | | | | |
| ... | | | | | | | | |

In Process 408, the actual number of arriving packets, from the first arrival data packet to the last arrival data packet, of the audio and video stream is obtained.

The CPU 21 may count the actual number of arriving packets of the audio and video stream.

For example, the CPU 21 may set a counter for each sample stream entry. The counter may count data packets that are received by the switch chip 22 and match the sample stream entry. Upon obtaining the second sample data packet, the CPU 21 may obtain the actual number of arriving packets of the audio and video stream by reading a count value of the counter corresponding to the sample stream entry.

In Process 409, a packet loss rate of the audio and video stream is calculated based on the original number of the packets being sent from the sender and the actual number of arriving packets.

Assuming that it is determined by the CPU 21 that the original number of the packets of the audio and video stream being sent from the sender is delta, and the actual number of the arriving packets of the audio and video stream is counter0, the packet loss rate of the audio and video stream in the current sampling period may be expressed as (delta−counter0)/delta.

In Process 410, the counted actual number of arriving packets of the audio and video stream is reset.

Upon obtaining the counted actual number of arriving packets of the audio and video stream, the CPU 21 may also reset the actual number, so as to prepare for the counting of the actual number of arriving packets of the audio and video stream in the next sampling period.

In an example, on the basis of the determined jitter and packet loss rate of the audio and video stream in the current sampling period as well as respective jitters and packet loss rates of the audio and video stream in historical sampling periods, the CPU 21 may determine a maximum jitter, a maximum packet loss rate, a minimum jitter, a minimum packet loss rate, an average jitter and an average packet loss rate of the audio and video stream.

For example, the CPU 21 may compare current index data of the jitter and the packet loss rate of the audio and video stream in the current sampling period with each of maximum index data and minimum index data of the audio and video stream in the historical sampling periods that are As described above, in the example illustrated in FIG. 2, analysis of different audio and video streams may start at different times. For analysis of each of the audio and video streams, it is not necessary to obtain all data packets in a period corresponding to the analysis, and only a copy of a data packet of the audio and video stream that arrived first in the period and a copy of a data packet of the audio and video stream that arrived last in the period may be obtained. Thus, the processing burden of the CPU may be reduced, and a case, where load of the CPU may be excessively heavy due to analysis of all audio and video streams at the same time and analysis of all data packets of each audio and video stream, may be avoided.

In addition, the RTP packet may not have real-time service quality guaranteed since the RTP packet is a data packet and the RTP protocol operates over the UDP protocol. In view of this, in some examples of the present disclosure, RTP packets for transmitting an audio and video stream are obtained, and a delay and a packet loss rate are analyzed based on the obtained RTP packets. Thus, a network node causing an audio and video service fault may be effectively located, so as to provide technical support to clear the audio and video service fault.

Figure 8:
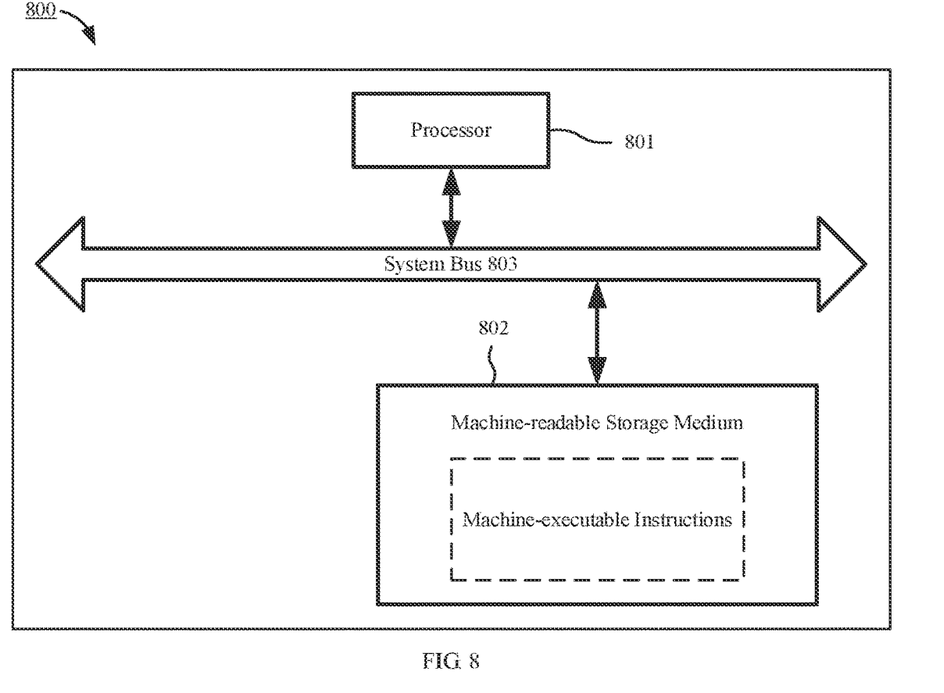
FIG. 8 is a block diagram of a device for analyzing a data stream according to an example of the present disclosure.

FIG. 8 illustrates a device 800 for analyzing a data stream according to an example of the present disclosure. The device 800 includes a processor 801, and a machine-readable storage medium 802 storing machine-executable instructions. The machine-readable storage medium 802 is, for example, a non-transitory storage medium. The processor 801 may communicate with the machine-readable storage medium 802 via a system bus 803. The processor 801 may implement any of the methods of analyzing the data stream as described above by reading and executing the machine-executable instructions that are stored in the machine-readable storage medium 802 and correspond to data stream analysis control logic.

As an example, the processor 801 executes the machine executable instructions to perform operations comprising: allocating one of a plurality of sampling periods to an audio and video stream, such that different audio and video streams are sampled respectively within the plurality of sampling periods, the plurality of sampling periods having a same sampling duration and having different start times respectively; copying a first arrival data packet of the audio and video stream within the allocated sampling period as a first sample data packet based on a sample stream entry corresponding to the audio and video stream; copying a last arrival data packet of the audio and video stream within the allocated sampling period as a second sample data packet based on the sample stream entry; calculating a sender delay and a receiver delay of the audio and video stream based on respective timestamps of the first sample data packet and the second sample data packet; and analyzing a jitter of the audio and video stream based on the sender delay and the receiver delay.

In one example, the processor 801 executes the machine executable instructions to perform operations comprising: calculating an original number of packets of the audio and video stream being sent from a sender based on a sequence number of the first sample data packet and a sequence number of the second sample data packet; obtaining an actual number of arriving packets, from the first arrival data packet to the last arrival data packet, of the audio and video stream; calculating a packet loss rate of the audio and video stream based on the original number and the actual number; and resetting the actual number of arriving packets of the audio and video stream.

The processor 801 executes the machine executable instructions to perform the copying of the first arrival data packet as the first sample data packet comprising: calculating the original number of packets of the audio and video stream being sent from the sender based on respective sequence numbers of the first sample data packet and the second sample data packet; and counting the actual number of arriving packets of the audio and video stream.

For example, the processor 801 executes the machine executable instructions to perform operations comprising: setting a counter for each sample stream entry, where the counter may count data packets that are received by the switch chip 22 and match the sample stream entry. The processor 801 executes the machine executable instructions to perform operations comprising: upon obtaining the second sample data packet, obtaining the actual number of arriving packets of the audio and video stream by reading a count value of the counter corresponding to the sample stream entry.

The processor 801 executes the machine executable instructions to perform operations comprising: calculating a packet loss rate of the audio and video stream based on the original number of the packets being sent from the sender and the actual number of arriving packets. The processor 801 executes the machine executable instructions to perform operations comprising: upon obtaining the counted actual number of arriving packets of the audio and video stream, resetting the counted actual number, so as to prepare for the counting of the actual number of arriving packets of the audio and video stream in the next sampling period.

The processor 801 executes the machine executable instructions to perform operations comprising: determining a maximum jitter, a maximum packet loss rate, a minimum jitter, a minimum packet loss rate, an average jitter and an average packet loss rate of the audio and video stream, on the basis of the determined jitter and packet loss rate of the audio and video stream in the current sampling period as well as respective jitters and packet loss rates of the audio and video stream in historical sampling periods.

In one example, the processor 801 executes the machine executable instructions to perform operations comprising: determining that the allocated sampling period has started; setting an action item for the sample stream entry corresponding to the audio and video stream, wherein a match item of the sample stream entry comprises characteristic information of the audio and video stream, and the action item is configured to instruct output of a copied packet to the processor; receiving a copy of the first arrival data packet based on the sample stream entry as the first sample data packet; and cancelling the action item of the sample flow table entry corresponding to the audio and video stream.

The processor 801 executes the machine executable instructions to perform operations comprising: determine whether the sampling period allocated to the audio and video stream has been started based on the start time of the sampling period allocated to the audio and video stream. The processor 801, by executing the machine-executable instruction, is further configured to, upon determining that the sampling period allocated to the audio and video stream has been started, set an action item for the sample stream entry corresponding to the audio and video stream, where the action item indicates that a copied data packet is able to be output, e.g., to the CPU. The processor 801, by executing the machine-executable instruction, is further configured to determine the copied packet as the first sample data packet of the audio and video stream, upon receiving a first copied packet of the audio and video stream within the current sampling period.

In one example, the processor 801 executes the machine executable instructions to perform operations comprising: determining that the allocated sampling period has ended; setting an action item for the sample stream entry corresponding to the audio and video stream, wherein a match item of the sample stream entry comprises characteristic information of the audio and video stream, and the action item is configured to instruct output of a copied packet to the processor; upon receiving a data packet copied based on the sample stream entry before exceeding a predetermined time after an end time of the allocated sampling period, cancelling the action item of the sample stream entry; and taking a data packet copied based on the sample stream entry which is received last before exceeding the predetermined time after the end time of the allocated sampling period as the second sample data packet.

The processor 801 executes the machine executable instructions to perform operations comprising: determining whether the sampling period allocated to the audio and video stream has ended based on the sampling duration and the start time of the scanner allocated to the audio and video stream. The processor 801 executes the machine executable instructions to perform operations comprising: determining that the sampling period allocated to the audio and video stream has ended, an action item may be set for the sample stream entry corresponding to the audio and video stream, so as to instruct output of a copied data packet to the processor. The processor 801 executes the machine executable instructions to perform operations comprising: after an action item is set for the sample stream entry corresponding to the audio and video stream, receiving a data packet copied based on the sample stream entry, that is, a copy of a data packet of the audio and video stream. The processor 801 executes the machine executable instructions to perform operations comprising: cancelling the action item of the sample stream entry, when receiving a data packet copied based on the sample stream entry before exceeding the predetermined time (for example, 5 seconds) after the end time of the sampling period allocated to the audio and video stream. The processor 801 executes the machine executable instructions to perform operations comprising: taking a data packet copied based on the sample stream entry, which is received last before exceeding the predetermined time after the end time of the sampling period allocated to the audio and video stream, as the second sample data packet.

In one example, before the processor 801 allocates one of the plurality of sampling periods to the audio and video stream, the processor 801 executes the machine executable instructions to perform operations comprising: receiving a copy of a first packet of the audio and video stream that is generated based on a default entry, wherein a match item of the default entry comprises a packet type corresponding to the audio and video stream, and an action item of the default entry is configured to instruct output of a copied packet to the processor; obtaining characteristic information of the audio and video stream based on the copy of the first packet; and setting the sample stream entry, wherein a match item of the sample stream entry comprises the characteristic information of the audio and video stream, and an action item of the sample stream entry is null.

The processor 801 executes the machine executable instructions to perform operations comprising: when a first packet of an audio and video stream arrives, performing forwarding for the first packet. The processor 801 executes the machine executable instructions to perform operations comprising: performs a lookup in the sample stream entries based on stream characteristic information in the first packet. The processor 801 executes the machine executable instructions to perform operations comprising: determining that none of the sample stream entries matches the first packet, and adding a matching failure flag to the first packet. The processor 801 executes the machine executable instructions to perform operations comprising: finding a default stream entry matching the first packet with the matching failure flag, where the default stream entry includes a match item comprising a packet type corresponding to the audio and video stream and the matching failure flag; and an action item indicating output of a copied data packet to the processor.

The processor 801, executes the machine executable instructions to perform operations comprising: receiving a first packet of an audio and video stream copied based on the default entry, and generating a new sample stream entry according to the obtained stream characteristic information of the first packet of the audio and video stream, where the match item includes audio and video stream characteristic information, and the action item is null.

The machine-readable storage medium 802 may be an electronic, magnetic, optical or other physical storage device, and may contain or store information, such as executable instructions, data, etc. For example, the machine-readable storage medium may comprise a volatile memory (for example, a Random Access Memory (RAM)), a non-volatile memory (for example, a flash memory, a storage drive (such as a hard disk drive), a solid state drive (SSD), an optical storage (for example, a Compact Disc Read-Only Memory (CD-ROM), a Digital Versatile Disc (DVD), etc.) or a combination thereof.

The present disclosure may further provide a non-transitory machine-readable storage medium storing computer-executable instructions, for example, the machine-readable storage medium 802 in FIG. 8. The computer-executable instructions are executable by a processor (for example, the processor 801 of the device for analyzing the data stream in FIG. 8) to implement any of the methods of analyzing the data stream as described above.

After considering the specification and practicing the present disclosure, those skilled in the art may easily think of other embodiments of the present disclosure. The present disclosure is intended to cover any variations, uses, or adaptive changes of the present disclosure that follow the general principles of the present disclosure and may include common general knowledge or conventional technical means in the art. The description and the examples are illustrative only, and the scope and spirit of the present disclosure are indicated in the following claims.

The invention claimed is:

1. A method of analyzing a data stream, comprising:
   allocating one of a plurality of sampling periods to an audio and video stream, such that different audio and video streams are sampled respectively within the plurality of sampling periods, the plurality of sampling periods having a same sampling duration and having different start times respectively;
   copying a first arrival data packet of the audio and video stream within the allocated sampling period as a first sample data packet based on a sample stream entry corresponding to the audio and video stream;
   copying a last arrival data packet of the audio and video stream within the allocated sampling period as a second sample data packet based on the sample stream entry;
   calculating a sender delay and a receiver delay of the audio and video stream based on respective timestamps of the first sample data packet and the second sample data packet; and
   analyzing a jitter of the audio and video stream based on the sender delay and the receiver delay,
   wherein other data packets of the audio and video stream matching the sample stream entry in the allocated sampling period, which arrived after the first arrival data packet and before the last arrival data packet, are not copied.

2. The method according to claim 1, further comprising:
   calculating an original number of packets of the audio and video stream being sent from a sender based on a sequence number of the first sample data packet and a sequence number of the second sample data packet;
   obtaining an actual number of arriving packets of the audio and video stream from the first arrival data packet to the last arrival data packet;
   calculating a packet loss rate of the audio and video stream based on the original number and the actual number; and
   resetting the actual number of arriving packets of the audio and video stream.

3. The method according to claim 1, wherein the copying the first arrival data packet of the audio and video stream within the allocated sampling period as the first sample data packet comprises:
   determining that the allocated sampling period has started;
   setting an action item for the sample stream entry corresponding to the audio and video stream, wherein a match item of the sample stream entry comprises characteristic information of the audio and video stream, and the action item is configured to instruct output of a copied packet to a central processing unit (CPU);
   receiving a copy of the first arrival data packet based on the sample stream entry as the first sample data packet; and
   cancelling the action item of the sample flow table-stream entry corresponding to the audio and video stream.

4. The method according to claim 1, wherein the copying the last arrival data packet of the audio and video stream within the allocated sampling period as the second sample data packet comprises:

determining that the allocated sampling period has ended;

setting an action item for the sample stream entry corresponding to the audio and video stream, wherein a match item of the sample stream entry comprises characteristic information of the audio and video stream, and the action item is configured to instruct output of a copied packet to a CPU;

upon receiving a data packet copied based on the sample stream entry within a predetermined time after an end time of the allocated sampling period, cancelling the action item of the sample stream entry; and taking a data packet copied based on the sample stream entry which is received last within the predetermined time after the end time of the allocated sampling period as the second sample data packet.

5. The method according to claim 1, further comprising: prior to allocating one of the plurality of sampling periods to the audio and video stream, receiving a copy of a first packet of the audio and video stream that is generated based on a default entry, wherein a match item of the default entry comprises a packet type corresponding to the audio and video stream, and an action item of the default entry is configured to instruct output of a copied packet to a CPU;

obtaining characteristic information of the audio and video stream based on the copy of the first packet; and setting the sample stream entry, wherein a match item of the sample stream entry comprises the characteristic information of the audio and video stream, and an action item of the sample stream entry is null.

6. A device for analyzing a data stream, comprising:

a processor; and a machine-readable storage medium storing instructions that are executable by the processor to perform operations comprising:

allocating one of a plurality of sampling periods to an audio and video stream, such that different audio and video streams are sampled respectively within the plurality of sampling periods, the plurality of sampling periods having a same sampling duration and having different start times respectively;

copying a first arrival data packet of the audio and video stream within the allocated sampling period as a first sample data packet based on a sample stream entry corresponding to the audio and video stream;

copying a last arrival data packet of the audio and video stream within the allocated sampling period as a second sample data packet based on the sample stream entry;

calculating a sender delay and a receiver delay of the audio and video stream based on respective timestamps of the first sample data packet and the second sample data packet; and analyzing a jitter of the audio and video stream based on the sender delay and the receiver delay, wherein other data packets of the audio and video stream matching the sample stream entry in the allocated sampling period, which arrived after the first arrival data packet and before the last arrival data packet, are not copied.

7. The device according to claim 6, wherein the operations further comprise:

calculating an original number of packets of the audio and video stream being sent from a sender based on a sequence number of the first sample data packet and a sequence number of the second sample data packet;

obtaining an actual number of arriving packets of the audio and video stream from the first arrival data packet to the last arrival data packet;

calculating a packet loss rate of the audio and video stream based on the original number and the actual number; and resetting the actual number of arriving packets of the audio and video stream.

8. The device according to claim 6, wherein the copying the first arrival data packet of the audio and video stream within the allocated sampling period as the first sample data packet comprises:

determining that the allocated sampling period has started;

setting an action item for the sample stream entry corresponding to the audio and video stream, wherein a match item of the sample stream entry comprises characteristic information of the audio and video stream, and the action item is configured to instruct output of a copied packet to the processor;

receiving a copy of the first arrival data packet based on the sample stream entry as the first sample data packet; and cancelling the action item of the sample stream entry corresponding to the audio and video stream.

9. The device according to claim 6, wherein the copying the last arrival data packet of the audio and video stream within the allocated sampling period as the second sample data packet comprises:

determining that the allocated sampling period has ended;

setting an action item for the sample stream entry corresponding to the audio and video stream, wherein a match item of the sample stream entry comprises characteristic information of the audio and video stream, and the action item is configured to instruct output of a copied packet to the processor;

upon receiving a data packet copied based on the sample stream entry within a predetermined time after an end time of the allocated sampling period, cancelling the action item of the sample stream entry; and taking a data packet copied based on the sample stream entry which is received last within the predetermined time after the end time of the allocated sampling period as the second sample data packet.

10. The device according to claim 6, wherein the operations further comprise: prior to allocating one of the plurality of sampling periods to the audio and video stream, receiving a copy of a first packet of the audio and video stream that is generated based on a default entry, wherein a match item of the default entry comprises a packet type corresponding to the audio and video stream, and an action item of the default entry is configured to instruct output of a copied packet to the processor;

obtaining characteristic information of the audio and video stream based on the copy of the first packet; and setting the sample stream entry, wherein a match item of the sample stream entry comprises the characteristic information of the audio and video stream, and an action item of the sample stream entry is null.

11. A non-transitory machine-readable storage medium storing instructions that are executable by a processor to perform operations comprising:

allocating one of a plurality of sampling periods to an audio and video stream, such that different audio and video streams are sampled respectively within the plurality of sampling periods, the plurality of sampling periods having a same sampling duration and having different start times respectively;

copying a first arrival data packet of the audio and video stream that arrived first within the allocated sampling period as a first sample data packet based on a sample stream entry corresponding to the audio and video stream;

copying a last arrival data packet of the audio and video stream that arrived last within the allocated sampling period as a second sample data packet based on the sample stream entry;

calculating a sender delay and a receiver delay of the audio and video stream based on respective timestamps of the first sample data packet and the second sample data packet; and analyzing a jitter of the audio and video stream based on the sender delay and the receiver delay, wherein other data packets of the audio and video stream matching the sample stream entry in the allocated sampling period, which arrived after the first arrival data packet and before the last arrival data packet, are not copied.

12. The non-transitory machine-readable storage medium according to claim 11, wherein the operations further comprise:

calculating an original number of packets of the audio and video stream being sent from a sender based on a sequence number of the first sample data packet and a sequence number of the second sample data packet;

obtaining an actual number of arriving packets of the audio and video stream from the first arrival data packet to the last arrival data packet;

calculating a packet loss rate of the audio and video stream based on the original number and the actual number; and resetting the actual number of arriving packets of the audio and video stream.

13. The non-transitory machine-readable storage medium according to claim 11, wherein the copying the first arrival data packet of the audio and video stream that arrived first within the allocated sampling period as the first sample data packet comprises:

determining that the allocated sampling period has started;

setting an action item for the sample stream entry corresponding to the audio and video stream, wherein a match item of the sample stream entry comprises characteristic information of the audio and video stream, and the action item is configured to instruct output of a copied packet to the processor;

receiving a copy of the first arrival data packet based on the sample stream entry as the first sample data packet; and cancelling the action item of the sample stream entry corresponding to the audio and video stream.

14. The non-transitory machine-readable storage medium according to claim 11, wherein the copying the last arrival data packet of the audio and video stream that arrived last within the allocated sampling period as the second sample data packet comprises:

determining that the allocated sampling period has ended;

setting an action item for the sample stream entry corresponding to the audio and video stream, wherein a match item of the sample stream entry comprises characteristic information of the audio and video stream, and the action item is configured to instruct output of a copied packet to the processor;

upon receiving a data packet copied based on the sample stream entry within a predetermined time after an end time of the allocated sampling period, cancelling the action item of the sample stream entry; and taking a data packet copied based on the sample stream entry which is received last within the predetermined time after the end time of the allocated sampling period as the second sample data packet.

15. The non-transitory machine-readable storage medium according to claim 11, wherein the operations further comprise: prior to allocating one of the plurality of sampling periods to the audio and video stream, receiving a copy of a first packet of the audio and video stream that is generated based on a default entry, wherein a match item of the default entry comprises a packet type corresponding to the audio and video stream, and an action item of the default entry is configured to instruct output of a copied packet to the processor;

obtaining characteristic information of the audio and video stream based on the copy of the first packet; and setting the sample stream entry, wherein a match item of the sample stream entry comprises the characteristic information of the audio and video stream, and an action item of the sample stream entry is null.

* * * * *